US008287359B2

(12) United States Patent
Nakamura

(10) Patent No.: US 8,287,359 B2
(45) **Date of Patent: *Oct. 16, 2012**

(54) GAMING MACHINE ARRANGING TWO SYMBOL COLUMNS IN THE SAME ORDER

(75) Inventor: Dalsuke Nakamura, Zama (JP)

(73) Assignee: Konami Gaming, Incorporated, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,810

(22) Filed: Jun. 15, 2011

(65) Prior Publication Data

US 2011/0244945 A1 Oct. 6, 2011

(51) Int. Cl.
*G06F 17/00* (2006.01)
*G06F 19/00* (2006.01)

(52) U.S. Cl. ................................ 463/20; 463/16; 463/30

(58) Field of Classification Search .............. 463/16–20, 463/25, 29–31; 273/138.1, 139
See application file for complete search history.

(56) References Cited

U.S. PATENT DOCUMENTS

| | | | |
|---|---|---|---|
| 5,085,436 | A | 2/1992 | Bennett |
| 5,722,891 | A | 3/1998 | Inoue |
| 6,186,894 | B1 | 2/2001 | Mayeroff |
| 6,241,607 | B1 | 6/2001 | Payne et al. |
| 6,394,902 | B1 | 5/2002 | Glavich et al. |
| 6,413,162 | B1 | 7/2002 | Baerlocher et al. |
| 6,475,087 | B1 | 11/2002 | Cole |
| 7,824,260 | B2 | 11/2010 | Aida |
| 2004/0102244 | A1 | 5/2004 | Kryuchkov et al. |
| 2004/0266520 | A1 | 12/2004 | Aida |
| 2007/0015565 | A1 | 1/2007 | Chan |
| 2007/0060323 | A1 | 3/2007 | Isaac et al. |
| 2007/0105610 | A1 | 5/2007 | Anderson |
| 2008/0113753 | A1 | 5/2008 | Nelson |
| 2009/0111571 | A1 | 4/2009 | Nakamura et al. |

FOREIGN PATENT DOCUMENTS

| | | | |
|---|---|---|---|
| JP | 2001-095972 | A | 4/2001 |
| JP | 2002-191782 | A | 7/2002 |
| JP | 2004-329297 | A | 11/2004 |
| JP | 2006-204537 | A | 8/2006 |

*Primary Examiner* — Milap Shah
(74) *Attorney, Agent, or Firm* — Howard & Howard Attorneys PLLC

(57) ABSTRACT

A display unit displays symbols in a plurality of columns, and in particular arranges the symbols in the same order in two or more of the columns. A game controller unit determines an arrangement of symbols at random on a condition that symbols are arranged in the same order and at the same positions in the two or more columns. A display controller unit causes the display unit to spin the two or more columns of symbols from the same position in synchronization with each other, and stop the two or more columns at the same position to display the arrangement of symbols determined by the game controller unit.

21 Claims, 6 Drawing Sheets

GAMING MACHINE ARRANGING TWO SYMBOL COLUMNS IN THE SAME ORDER

CROSS REFERENCE TO RELATED APPLICATION

This application claims the benefit of U.S. patent application Ser. No. 11/924,064, filed Oct. 25, 2007, issued as U.S. Pat. No. 8,052,515, the disclosures of which are hereby incorporated by reference in its entirety.

FIELD OF THE INVENTION

The present invention relates to a gaming machine that is installed in a casino or the like, and in particular conducts a slot game.

BACKGROUND INFORMATION

Gaming machines such as slot machines, poker machines, fruit machines, and the like generally attract enormous popularity from players in casinos. Such a gaming machine displays an arrangement of symbols on the front thereof, and randomly changes types of symbols in the arrangement at each round of game. A player places a bet at the start of each round. If a winning combination appears in the arrangement, the player will win an amount of a payout that depends on the amount of the bet and the type of the winning combination.

This type of gaming machine is generally equipped with mechanical reels that are coaxially arranged and allowed to independently spin by respective motors. Symbols are permanently displayed, e.g., printed on the circumferential surfaces on each reel in a predetermined order. Mechanical reels repeat spins and stops, and thereby change visible symbols at random. Alternatively, this type of gaming machine may use an electric display device to display symbols in graphic form on a screen thereof. The symbols are aligned in two or more columns, i.e., video reels. Like mechanical reels repeating spins and stops, video reels repeatedly change in appearance, and thereby symbols repeatedly move and stop in a vertical direction. Such actions of symbols are often referred to as "spins and stops of video reels". There is also a mechanical reel with one or more electric display devices mounted on the circumferential surface of the mechanical reel. Symbols are displayed in graphic form on a screen of the electric display device. Visible symbols move and change, whichever the mechanical reel spins or the electric display device changes images produced thereon.

Most players prefer a gaming machine that can provide a larger amount of payout. The upper limit of payout per round generally depends on a total number of types of symbol arrangements visible on reels. Mechanical reels have a limited number of symbol types mainly because of their sizes. In order to increase the upper limit of payout per round, a gaming machine with mechanical reels randomly provides a player with a right to play a bonus round. A player can win a larger amount of payout, or an amount of payout more frequently at a bonus round than at a normal round. In addition, a player can play a bonus round for free.

On the other hand, video reels have no limited number of symbol types in principle. However, a gaming machine with video reels also provides a player with a right to play a bonus round in order to enhance the variety of game contents and visual effects, and thereby attract a larger number of players.

Recent remarkable progress on game controllers, computer graphics, and display devices enables gaming machines to produce more various types of bonus rounds with more complex rules and visual effects. This facilitates differentiation of a type of gaming machines from others. On the other hand, excessively complex rules and visual effects may prevent gaming machines to raise players' expectations for winning In addition, excessively complex rules and visual effects may place a heavy burden on game designers and developers.

In view of the above, it will be apparent to those skilled in the art from this disclosure that there exists a need for an improved gaming machine that can produce a bonus round with more simple rules and visual effects, and thereby cause a player to recognize the bonus round more clearly and reduce a burden on game designers and developers. This invention addresses this need in the art as well as other needs, which will become apparent to those skilled in the art from this disclosure.

SUMMARY OF THE INVENTION

A gaming machine according to the present invention comprises a display unit, a console unit, a game controller unit, and a display controller unit.

The display unit is configured to display symbols in a plurality of columns. The display unit preferably arranges the symbols in the same order in two or more of the columns. The display unit is configured to spin and stop the columns of symbols.

The console unit is configured to accept instructions from a player. The instructions preferably indicate starting a round of game or placing a bet. The console unit is preferably configured to accept money from a player.

The game controller unit is configured to execute a game program, and thereby control the following functions of game. First, the game controller unit starts a round of game in response to an instruction accepted by the console unit. Here, the game controller unit preferably uses a portion of the money accepted by the console unit as a bet. The game controller unit may interpret the instruction to place a bet as a cue for starting a round of game. Second, the game controller unit determines an arrangement of symbols at random on a condition that symbols are arranged in the same order and at the same positions in the two or more columns. Third, the game controller unit retrieves a winning combination from the arrangement of symbols. Fourth, the game controller unit provides the player with an award depending on the winning combination retrieved from the arrangement of symbols. Here, the game controller unit may determine the type of the award depending on the bet.

The display controller unit is configured to cause the display unit to spin the two or more columns of symbols from the same position in synchronization with each other, and stop the two or more columns at the same position to display the arrangement of symbols determined by the game controller unit.

In general, a winning combination includes the same type of symbols at the same positions of two or more columns. Since the game controller unit determines an arrangement of symbols on the condition that symbols are arranged in the same order and at the same positions in two or more columns, chances are fairly good that a winning combination will appear in the arrangement determined by the game controller unit. Furthermore, the display unit spins the two or more columns of symbols from the same position in synchronization with each other. This effectively raises player's expectations for winning an award. On the other hand, the condition is easy to impose on the game controller unit. The display controller unit can easily control the two or more columns of symbols spinning in the above-mentioned synchronized manner. Thus, the gaming machine can provide a player with a better chance of winning an award in a simple manner, and cause the player to recognize the chance through simple and clear visual effects, without any heavy burden on game designers and developers.

Preferably, the display unit comprises a mechanical reel rotatable around its axis and having a circumferential surface on which a column of symbols is displayed. Alternatively, the display unit may comprise an electric display device on which a column of symbols is displayed in a graphic form. The electric display device may be mounted on the circumferential surface of a mechanical reel, and thereby rotatable together with the mechanical reel around the axis thereof.

The game controller unit preferably determines an arrangement of symbols at random without the above-mentioned condition in normal games, and on the condition in bonus games. In that case, the display controller unit preferably causes the display unit to spin all columns of symbols independently in normal games, and spin the two or more columns of symbols from the same position in synchronization with each other in bonus games.

The display unit preferably pairs a left end column of symbols with a right end column thereof in turn, starting from the outmost columns thereof, and arranges symbols in the same order in each pair of columns. In that case, the game controller unit preferably determines an arrangement of symbols at random on a condition that symbols are arranged in the same order and at the same positions in each pair of columns. Furthermore, the display controller unit preferably causes the display unit to spin each pair of columns from the same position in synchronization with each other, and stop the pairs at respective positions in the order from outermost to innermost. Note that the display controller unit may cause the display unit to stop the pairs in another order, e.g., from innermost to outermost, or at random. Alternatively, the display unit may pair different two columns, e.g., two adjacent columns or two columns separated by one other column.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a portion of this original disclosure.

DETAILED DESCRIPTION OF THE PREFERRED EMBODIMENT

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
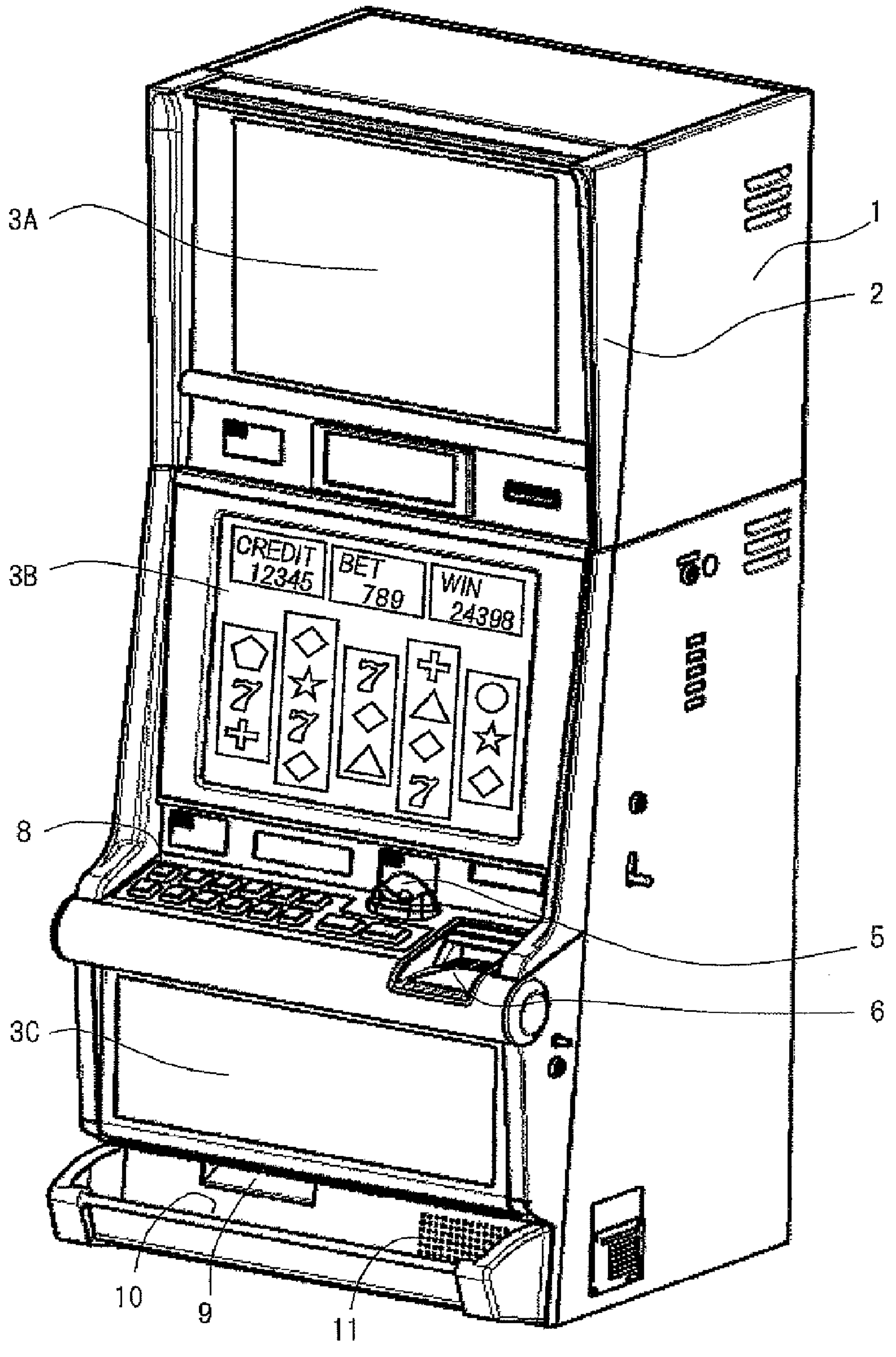
FIG. 1 is a perspective view of the appearance of a gaming machine according to an embodiment of the present invention.

A preferred embodiment of the present invention is a video gaming machine preferably installed in a casino. Referring to FIG. 1, the gaming machine comprises a box-shaped cabinet 1 with an openable and closable front panel 2. Three display units 3A, 3B, and 3C are mounted on the upper portion, the middle portion, and the lower portion of the front panel 2, respectively. A coin slot 5, a bill slot 6, and various push buttons 8 are mounted between the middle display window 3B and the lower display window 3C. A coin chute 9, a coin tray 10, and a speaker 11 are installed below the lower display window 3C.

The three display units 3A, 3B, and 3C each include a flat display device preferably, or a liquid crystal display device more preferably. The display units 3A, 3B, and 3C produce various images, for example, images for use in decoration and advertisements, e.g., the logo of a game developer, images for use in visual effects in games, and visualized information on games, e.g., pay tables, illustrations of game content, and jackpot meters.

Figure 3:
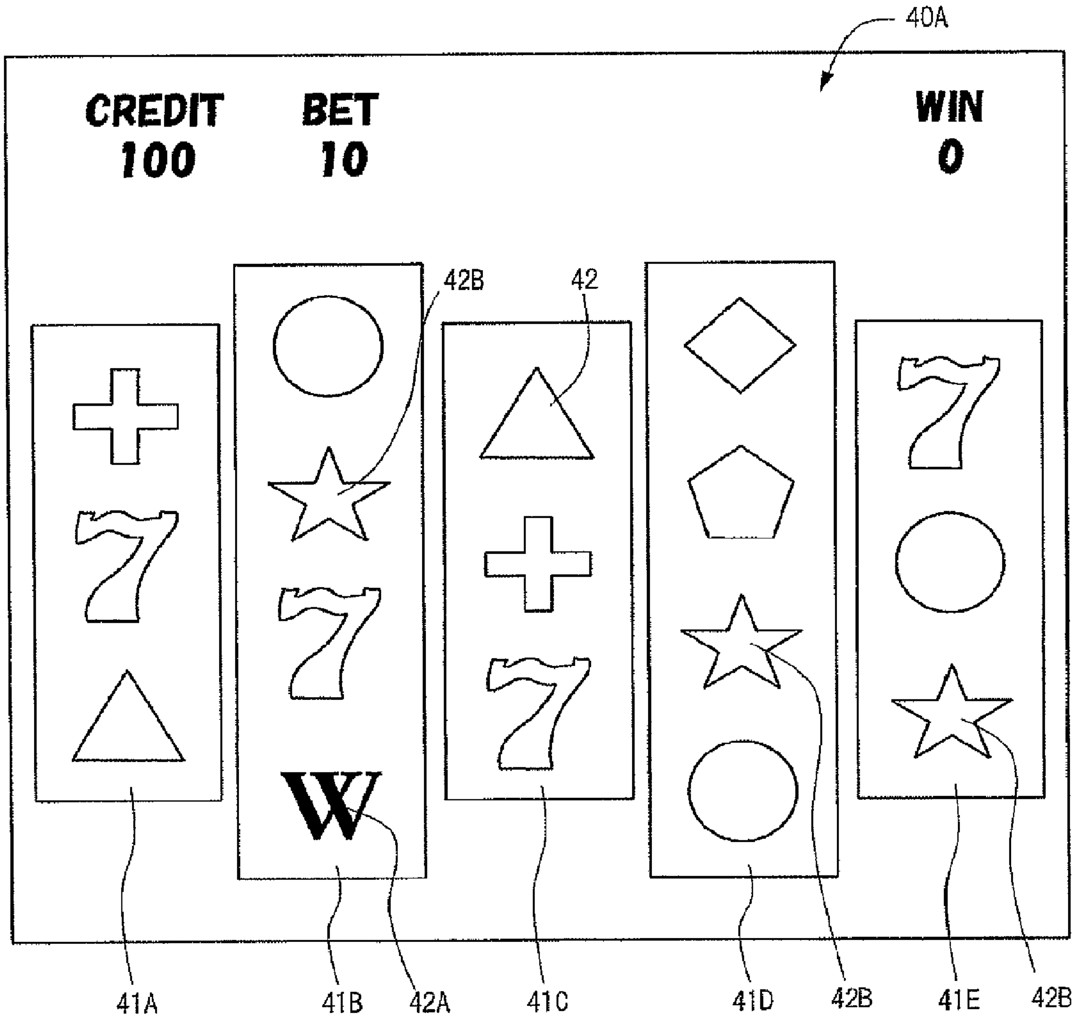
FIG. 3 shows an example of a game screen at a normal round, which is displayed on the gaming machine shown in FIG. 1.

In particular, the middle display unit 3B displays a game screen. FIG. 3 shows an example of a game screen 40A. The game screen 40A preferably including five video reels 41A-41E, i.e., five columns of symbols 42. Note that the number of video reels may be changed from five to other number, e.g., three. The game screen 40A also includes three meters that indicate the number of available credits of a player, the amount of a bet placed at a round, and the amount of a payout that the player has won at the round.

On each video reels 41A-41E, symbols 42 can be repeatedly moved and stopped in a vertical direction at each round of game. In other words, the video reels 41A-41E can separately spin and stop at each round. In a spin of each video reel, different types of symbols 42 appear in a predetermined order. The order preferably varies with video reels. After a predetermined time has elapsed from the start of the spin of the video reels 41A-41E, symbols 42 will be stopped column by column in an arrangement. The arrangement is randomly changed at every round of game. On each video reel 41A-41E in a stop position, preferably three or more symbols 42 are aligned in a column. The video reels 41A-41E are preferably divided into two types, i.e., a long type and a short type. A long-type video reel 41B and 41D preferably includes one more symbols than a short type video reel 41A, 41C, and 41E. Long- and short-type video reels are alternately arranged on the game screen 40A. As a result, all symbols 42 are preferably arranged on a honeycomb or hexagonal lattice when all the video reels 41A-41E are stopped. Note that symbols 42 may be arranged on another type of lattice, e.g., a square lattice.

The gaming machine preferably conducts a game having two modes, i.e., a normal mode and a bonus mode. Details of rounds in the two modes will be described below. The appearances of the video reels 41A-41E are preferably changed depending on whether a round of game is in a normal or bonus mode.

Figure 4:
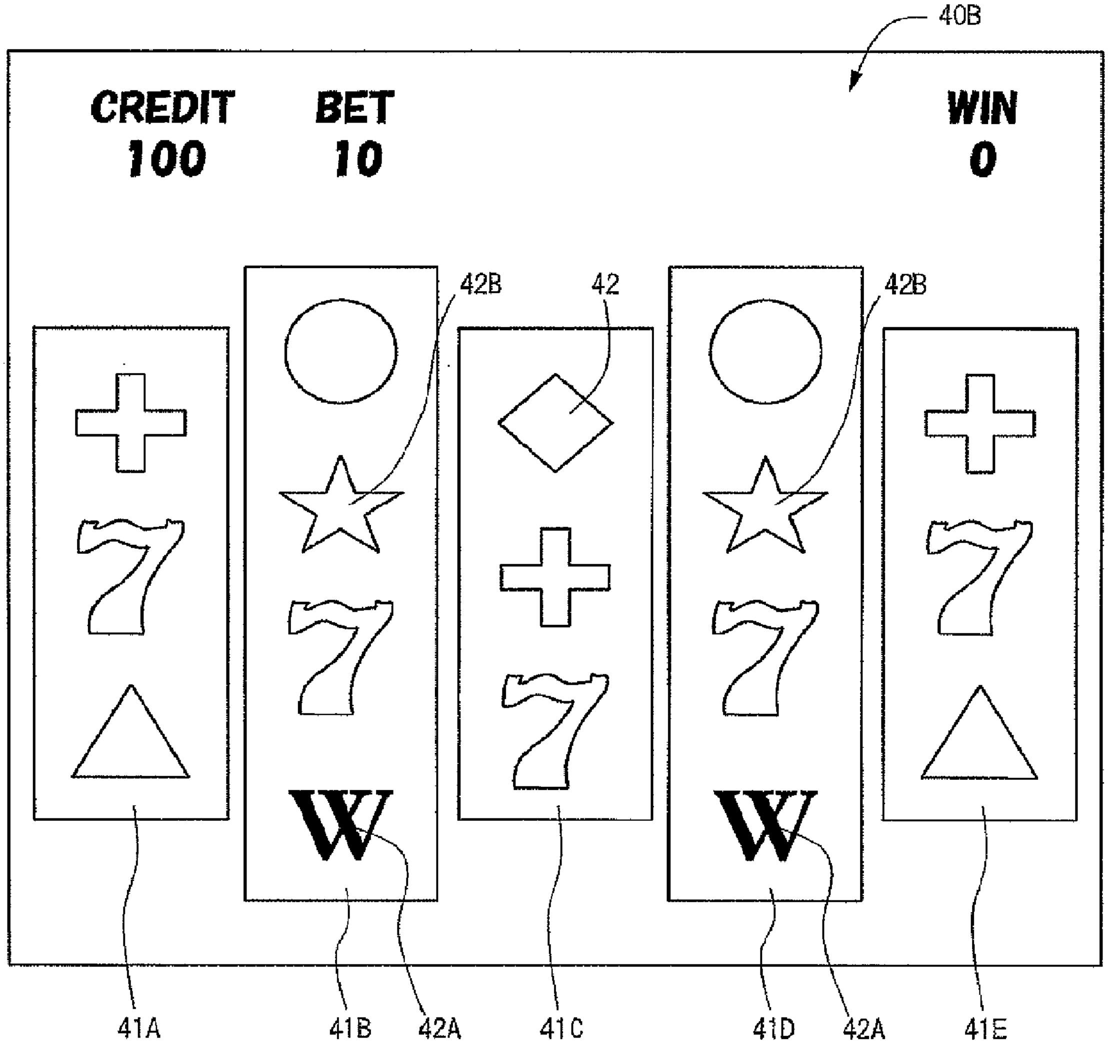
FIG. 4 shows an example of a game screen at a bonus round, which is 30 displayed on the gaming machine shown in FIG. I.

FIG. 3 shows a game screen 40A displayed in a normal round. In spins of the video reels 41A-41E, symbols 42 appear in different orders on different video reels 41A-41E. FIG. 4 shows an example of a game screen 40B displayed in a bonus round. In the game screen 40B displayed in a bonus round, two or more video reels are grouped. Preferably, a left end video reel is paired with a right end video reel in turn, starting from the outmost video reels. Referring to FIG. 4, when the video reels 41A-41E are numbered from left to right starting at 1, the first video reel 41A is paired with the fifth video reel 41E, and the second video reel 41B is paired with the fourth video reel 41D. The third video reel 41C is by itself classified into a single group. Note that different two video reels, e.g., two adjacent video reels or two video reels separated by one other video reels may be paired. Alternatively, any three of the video reels 41A-41E may constitute a single group. In each pair of the video reels 41A-41E, symbols 42 are arranged in the same order and the same positions. Furthermore, each pair of the video reels 41A-41E spins from the same position in synchronization with each other, and stops at the same positions. In other words, a symbol arrangement on the video reels 41A-41E is left-right symmetric throughout a bonus round, regardless of whether the video reels 41A-41E spin or stop.

The gaming machine provides a player with an award depending on a winning combination of symbols appearing on stopped video reels. Types of winning combinations can be determined by various rules. Each winning combination preferably pay from left to right in both of normal and bonus rounds. In the case of the video reels 41A-41E shown in FIGS. 3 and 4, if symbols of the same type appear on three or more consecutive video reels starting from the left end column 41A, the symbols constitute a winning combination. Alternatively, a winning combination may be formed by symbols of the same type scattered on any three or more video reels. Types of awards preferably include an amount of a payout and a right to play a bonus round. Types of awards vary with amounts of bets, and types and numbers of symbols included in winning combinations.

As easily understood through a comparison between FIGS. 3 and 4, there is a much better chance that three or more symbols of the same type appear on the stopped video reels 41A-41E at a bonus round than at a normal round. As a result, the player has a much better chance of winning a larger amount of payouts at a bonus round than at a normal round.

The coin slot 5 and the bill slot 6 allow a player to enter coins and bills thereinto, respectively. The entered coins and bills are counted by a counter and validated by an acceptor. The counter and the acceptor are preferably installed inside the cabinet 1. The total amount of the validated coins and bills are displayed on the middle display unit 3B as credits available to the player. A coin hopper installed inside the cabinet 1 stores a large number of coins and bills together with the coins and bills entered by the player. The coin hopper discharges coins or bills equivalent to credits that a player has won on a game through the coin chute 9 into the coin tray 10 or through the bill slot 6, respectively. Note that the gaming machine may support a ticket-in/ticket-out system, i.e., accept and print a bar-coded paper ticket. A bar code printed on the ticket represents monetary data available to a player.

The push buttons 8 allow a player to operate the gaming machine. For example, by using the push buttons 8, a player can place a desired amount of a bet on each round of game. The player then pushes a spin button included in the push buttons 8 to cause the video reels 41A-41E to start spinning. After a predetermined time has elapsed, if the arrangement of stopped symbols 42 includes a winning, combination, the player will win an award depending on the amount of the bet and the type of the winning combination. The player will be allowed to push a cash-out button included in the push buttons 8, and then receive coins or bills equivalent to his/her credits from the coin chute 9 or the bill slot 6, respectively. The player may also use a push button 8 to select coins or bills into which his/her credits are to be converted. The push buttons 8 are preferably lamp buttons, which each include a light-emitting device and lights up when pushed by a player or used in lighting effects during game play.

The speaker 11 is installed inside the cabinet 1, and generates voice announcements and sound effects during game play.

The above-described components of the gaming machine are preferably controlled by a game controller unit that is preferably installed inside the cabinet 1. Alternatively, the game controller unit may be separated from the cabinet 1, and connected through a network to the components of the cabinet 1.

Figure 2:
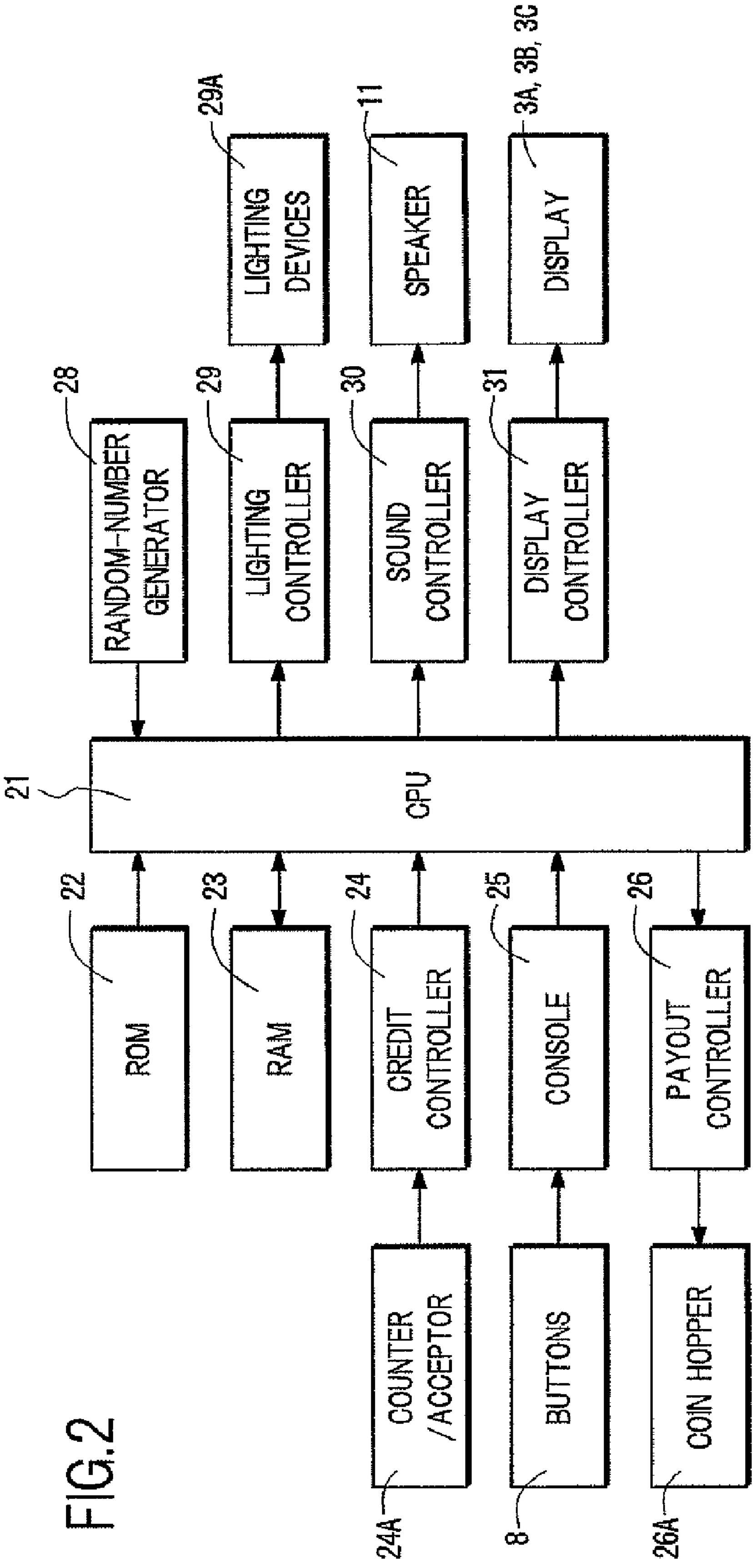
FIG. 2 is a block diagram of the hardware configuration of a game controller unit included in the gaming machine shown in FIG. 1.

Referring to FIG. 2, the game controller unit includes a CPU 21, a ROM 22, a RAM 23, a credit controller unit 24, a console unit 25, a payout controller unit 26, a random-number generator unit 28, a lighting controller unit 29, a sound controller unit 30, and a display controller unit 31.

The CPU 21 executes various programs, and thereby controls other components of the game controller unit according to instructions and data accepted by the console unit 25. The CPU 21 in particular executes a game program, and thereby conducts a game having normal and bonus modes. The ROM 22 stores programs and databases used by the CPU 21. The ROM 22 in particular stores image data for producing two types of game screens 40A and 40B and various symbols 42 on the middle display unit 3B. The RAM 23 temporarily stores variables, parameters, and the like that are used by the CPU 21.

The credit controller unit 24 manages the amount of player's credits, which is equivalent to the amount of coins and bills counted and validated by the counter/acceptor 24A. The console unit 25 monitors the push buttons 8 and accepts various instructions and data that a player enters through the push buttons 8. The payout controller unit 26 changes player's credits to coins, bills, or other monetary data by using the coin hopper 26A or the like.

The random-number generator unit 28 generates and outputs random numbers to the CPU 21 preferably at the start of each round of game. The CPU 21 uses the random numbers to randomly select an arrangement of symbols 42 to be displayed on the video reels 41A-41E when they will stop. Each of the random numbers is uniquely assigned to one of the video reels 41A-41E. The CPU 21 retrieves stop positions of the video reels 41A-41E linked to the random numbers from respective stop position tables. Here, the stop position of a video reel corresponds to types of symbols 42 to be displayed on the video reel when it stopped. The stop position tables are preferably stored in the ROM 22. Each of the stop position tables is assigned to one of the video reels 41A-41E, and represents relationship between random numbers and stop positions of the video reel. Thus, the CPU 21 selects stop positions of the video reels 41A-41E at random.

The random-number generator unit 28 preferably generates the same number of random numbers as the video reels 41A-41E at each normal round, and the same number of random numbers as groups of the video reels 41A-41E at each bonus round. In the case where five video reels 41A-41E are prepared as shown in FIG. 3 and divided into three groups as shown in FIG. 4, the random-number generator unit preferably generates five or three random numbers in each normal or bonus round, respectively. Accordingly, the CPU 21 randomly selects stop positions of all the five video reels 41A-41E or only three thereof 41A-41C in each normal or bonus round, respectively.

The CPU 21 preferably uses the random numbers to determine whether or not to provide an award to a player at random in the following manner. The CPU 21 retrieves the random numbers from a winning combination table stored in the ROM 22. The winning combination table represents relationship between combinations of random numbers and types of awards. Here, in the stop position tables, the same combination of random numbers as that included in the winning combination table is linked to a stop position of the video reels 41A-41E in which a winning combination appears. Accordingly, a type of an award is assigned to each winning combination appearing on the stopped video reels 41A-41E. Note that the ROM 22 preferably stores two different types of winning combination tables, one used in the normal mode and the other used in the bonus mode. The CPU 21 preferably selects a type of a winning combination table depending on whether a round is in the normal or bonus mode. If the CPU 21 retrieves an award linked to the combination of the random numbers from the selected winning combination table, the CPU 21 then decides to provide the award to a player. More specifically, the CPU 21 will increase the player's credits by a payout, or change the normal mode to the bonus mode.

In the case of the video reels 41A-41E shown in FIGS. 3 and 4, if symbols of the same type appear on three or more consecutive video reels starting from the left end column 41A, the symbols constitute a winning combination. Referring to FIG. 3, three "seven" symbols appear on the stopped video reels consecutively from the first video reel 41A through the third video reel 41C. In this case, the CPU 21 will increase the player's credits by a payout equal to a bet times a factor that corresponds to the three "seven" symbols.

Wildcard symbols can preferably appear on the video reels 41A-41E. Referring to FIG. 3, a "W" symbol 42A represents a wildcard symbol, which can preferably appear on long-type video reels 41B and 41D. A wildcard symbol substitutes for any other type of symbol. If one or more wildcard symbol appear on the video reels 41A-41E in stop positions linked to the random numbers, and if a winning combination is formed by replacing the wildcard symbols with a type of symbols, the combination of the random numbers is preferably assigned to a payout two or four times as much as a payout corresponding to the winning combination. The assignment is achieved in the combination of the winning combination table and the stop position table. The factor of two or four is selected when the winning combination includes one or two wildcard symbols, respectively. In the case of FIG. 3, the "W" symbol 42A substitutes for a "cross" symbol or a "triangle" symbol, whichever is advantageous for a player, preferably. Then, the CPU 21 increases the player's credits by a payout equal to a bet times a factor twice as many as a factor corresponding to three "cross" or "triangle" symbols.

Trigger symbols can preferably appear on the video reels 41A-41E. Referring to FIG. 3, a "star" symbol 42B represents a trigger symbol, which can preferably appear on any video reels 41A-41E. As three "star" symbols 42B shown in FIG. 3, if three or more trigger symbols are scattered on the video reels 41A-41E in stop positions linked to the random numbers in the stop position table, the combination of the random numbers is assigned to a right to play a bonus round in the winning combination table. When the CPU 21 retrieves the right linked to the combination of the random numbers from the winning combination table, the CPU 21 then changes the normal mode to the bonus mode.

At a bonus round, the CPU 21 uses only three random numbers to determine stop positions of the video reels 41A-41E and decide whether or not to provide an award. The types of random numbers are reduced on a condition that symbols 42 are arranged in the same order and at the same positions in each pair or group of the video reels 41A-41E as shown in FIG. 4. Since a symbol arrangement on the video reels 41A-41E is left-right symmetric, the CPU 21 preferably has to determine stop positions of the left three video reels 41A, 41B, and 41C only, and check if symbols of the same type appear on all the three video reels 41A, 41B, and 41C in stop positions. If so, symbols of the same type necessarily appear on other two video reels 41D and 41E because of the left-right symmetry of the symbol arrangement. Accordingly, there is a much better chance that five symbols of the same type appear on all the stopped video reels 41A-41E at a bonus round than at a normal round. As a result, the player has a much better chance of winning a larger amount of payouts at a bonus round than at a normal round.

Referring to FIG. 4, five "seven" symbols appear. In addition, two wildcard symbols, i.e., "W" symbols 42A always appear at the same time in a bonus round, as shown in FIG. 4. In FIG. 4, the two "W" symbols 42A constitute a winning combination together with three "cross" symbols appearing on other three video reels 41A, 41C, and 41E. In this case, the CPU 21 will increase the player's credits by a payout equal to a bet times a factor corresponding to the five "seven" symbols or the group of the three "cross" symbols and the two "W" symbols 42A, whichever is advantageous for a player, preferably. Note that the factor corresponding to the group is four times as many as a factor corresponding to five "cross" symbols, since the group includes two wildcard symbols 42A.

Preferably, trigger symbols, e.g., "star" symbols 42B in FIG. 4, can also appear on the video reels 41A-41E in a bonus round. If three or more trigger symbols appear on the video reels 41A-41E in stop positions linked to the random numbers in the stop position table, the combination of the random numbers is assigned to a right to play a bonus round in the winning combination table. In the case of FIG. 4, if any symbol were replaced with a "star" symbol, the right to play a bonus round would be assigned to the same random numbers as those assigned to the corresponding stop positions of the video reels 41A-41E. When the CPU 21 retrieves the right linked to the combination of the random numbers from the winning combination table, the CPU 21 then continues a next round in the bonus mode.

The lighting controller unit 29 controls lighting devices 29A installed in the three display units 3A, 3B, and 3C, the push buttons 8, and other lumps mounted on the cabinet 1 during game play. The lighting controller unit 29 thereby causes the lighting devices 29A to blink and/or change brightness and color in specific patterns in order to produces lighting effects. The sound controller 27 controls the speaker 11 to output voice announcements and sound effects during game play.

The display controller unit 31 controls the three display units 3A, 3B, and 3C to display various images on screens preferably by using computer graphics and image data stored in the ROM 22. The display controller unit 31 in particular controls video reels in a game screen displayed on the middle display unit 3B by using computer graphics and the image data.

The display controller unit 31 further controls video reels in different manners depending on whether a round of game is in a normal or bonus mode.

On a game screen 40A in a normal round shown in FIG. 3, the display controller unit 31 preferably causes symbols 42 to appear in different orders on different video reels 41A-41E when spinning. Here, information on the orders is preferably stored in the ROM 22. After a predetermined time has elapsed from the start of the spin of the video reels 41A-41E, the display controller unit 31 will preferably stop the video reels 41A-41E one by one in their respective stop positions that the CPU 21 randomly selects at the start of each flotilla' round.

On a game screen 40B in a bonus round shown in FIG. 4, the display controller unit 31 preferably pairs the first video reel 41A with the fifth video reel 41E, and the second video reel 41B with the fourth video reel 41D. Then, the display controller unit 31 preferably arranges symbols 42 in the same order in each pair of video reels. Furthermore, the display controller unit 31 preferably spins each pair of video reels from the same position in synchronization with each other. Here, the display controller unit 31 preferably starts spinning each pair of video reels from the same stop position. Alternatively, the CPU 21 or the display controller unit 31 may adjust the rotation speeds of spinning video reels, and thereby synchronize each pair of video reels from a certain moment when both the video reels locate at the same position. After a predetermined time has elapsed the display controller unit 31 stops the pairs of video reels at the same positions. In other words, the display controller unit 31 maintains a symbol arrangement on the video reels 41A-41E left-right symmetric throughout a bonus round, regardless of whether the video reels 41A-41E spin or stop.

Referring to FIGS. 5A through 5F, operations of the gaming machine will be explained below in the order of processes in a round of game.

A player inserts coins or bills into the coin slot 5 or the bill slot 6, respectively. Then, the counter/acceptor 24A validates the coins and bills, and counts the valid coins and bills. The game controller unit reads the count and updates credit data stored in the RAM 23 to increase player's credits by the number corresponding to the count. Then, the game controller unit starts a normal round of game. When the console unit 25 accepts a bet placed by the player through the buttons 8, the game controller unit enables the console unit 25 to accept a cue to start spinning of video reels 41A-41E from a spin button, one of the buttons 8. When the console unit 25 detects a push of the spin button 8, the game controller unit updates the credit data stored in the RAM 23 to decrease the amount of the credits by the amount of the bet.

The game controller unit causes the random number generator unit 28 to generate five random numbers. The game controller unit then retrieves stop positions of the video reels 41A-41E linked to the five random numbers from respective stop position tables. Thus, the game controller unit selects stop positions of the video reels 41A-41E at random, and stores data representing the stop positions into the RAM 23, preferably.

The game controller unit also retrieves the five random numbers from a winning combination table for use in the normal mode. If the game controller unit retrieves an award linked to the combination of the five random numbers from the winning combination table, the game controller unit then decides to provide the award to the player.

Figure 5A:
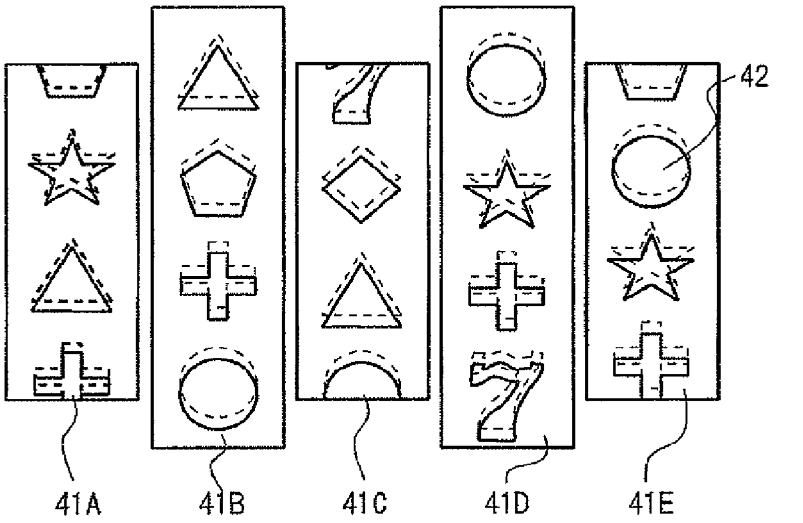
FIG. 5A shows an example of moving symbols at a normal round.

The game controller unit instructs the display controller unit 31 to cause the middle display unit 3B to start spinning the video reels 41A-41E. Then, the video reels 41A-41E start spinning as shown in FIG. 5A. Symbols 42 appear in different orders on different video reels 41A-41E.

Figure 5B:
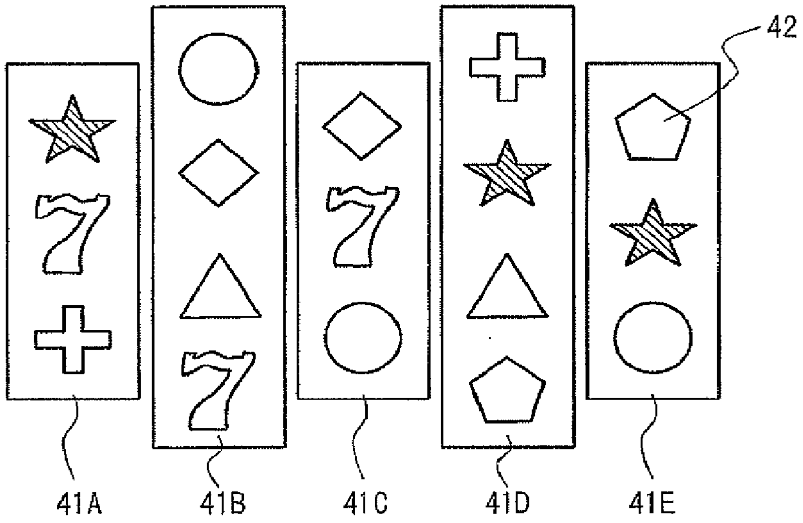
FIG. 5B shows an example of stopped symbols at a normal round.

At predetermined time intervals, the display controller unit 31 causes the middle display unit 3B to stop the video reels 41A-41E one by one into their respective stop positions selected by the game controller unit. Then, the video reels 41A-41E stop in positions as shown in FIG. 5B. If the game controller unit has decided to provide no award to the player, the game controller unit finishes the normal round, and then waits until the console unit 25 accepts a new bet or an instruction from the player. If instructed by the player, the game controller unit may convert his/her credits into cash or the like by using the payout controller unit 26.

If the game controller unit has decided to provide the player with a payout, a corresponding winning combination appears on the stopped video reels 41A-41E. Referring to FIG. 5B, three "seven" symbols appear consecutively from the first video reel 41A through the third video reel 41C. The game controller unit then controls visual and sound effects representing the winning of the payout by providing the lighting controller unit 29 and the sound controller unit 30 with commands. The lighting controller unit 29 then turns on and off the lighting devices 29A in patterns represented by the commands. The sound controller unit 30 changes sounds produced from the speaker 11 to the sound effects represented by the commands. After that, the game controller unit updates the credit data stored in the RAM 23 to increase the player's credits by a payout to be provided as an award. In the case of FIG. 5B, the payout is equal to a bet times a factor that corresponds to three "seven" symbols. If instructed by the player, the game controller unit may provide him/her with the payout in cash or the like by using the payout controller unit 26.

If the game controller unit has decided to provide the player with a right to play a bonus round, three or more trigger symbols are scattered on the stopped video reels 41A-41E. Referring to FIG. 5B, three "star" symbols 42B appear as the trigger symbols on the first video reel 41A, the fourth video reel 41D, and the fifth video reel 41E. The game controller unit then instructs the lighting controller unit 29 and the sound controller unit 30 to produce specific visual and sound effects. The game controller unit further starts a bonus round.

The game controller unit preferably conducts a bonus round for free, i.e., allows a fixed bet to be placed without reducing the player's credits. Note that the game controller unit may use a portion of the player's credits as a bet.

At the start of a bonus round, the game controller unit enables the console unit 25 to accept a cue to start spinning of video reels 41A-41E from a spin button. When the console unit 25 detects a push of the spin button 8, the game controller unit causes the random number generator unit 28 to generate three random numbers. The game controller unit then retrieves stop positions of the left three video reels 41A-41C linked to the three random numbers from respective stop position tables. Thus, the game controller unit stores data representing the stop positions into the RAM 23, preferably.

The game controller unit also retrieves the three random numbers from a winning combination table for use in the bonus mode. If the game controller unit retrieves an award linked to the combination of the three random numbers from the winning combination table, the game controller unit then decides to provide the award to the player.

Figure 5C:
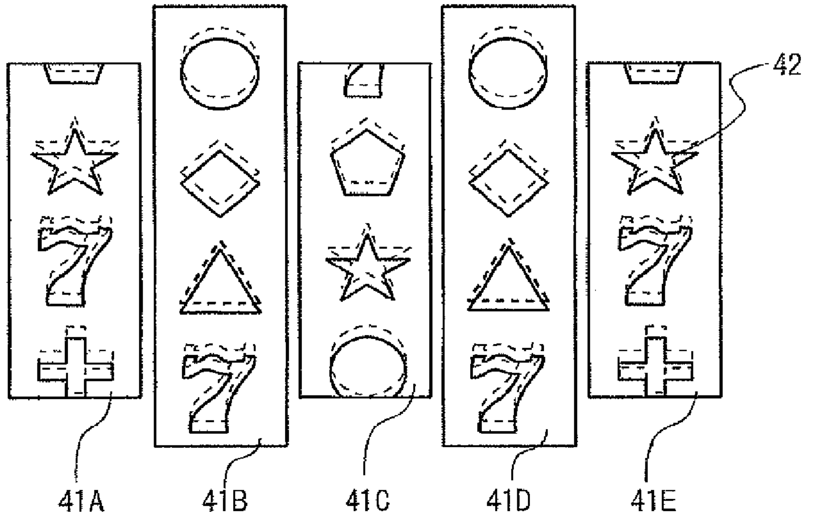
FIG. 5C shows an example of moving symbols at the start of a bonus round.

The game controller unit instructs the display controller unit 31 to cause the middle display unit 3B to start spinning the video reels 41A-41E. Then, the video reels 41A-41E start spinning as shown in FIG. 5C. Here, the display controller unit 31 pairs the first video reel 41A with the fifth video reel 41E, and the second video reel 41B with the fourth video reel 41D. Then, the display controller unit 31 arranges symbols 42 in the same order in each pair of video reels. Furthermore, the display controller unit 31 starts spinning each pair of video reels from the same stop position in synchronization with each other. More specifically, the display controller unit 31 always causes the same symbols to appear on the pair of the first video reel 41A and the fifth video reel 41E. Similarly, the display controller unit 31 always causes the same symbols to appear on the pair of the second video reel 41B and the fourth video reel 41D. Alternatively, the display controller unit 31 may adjust the rotation speeds of the video reels 41A-41E after they start spinning, and thereby synchronize each pair of video reels from a certain moment when both the video reels locate at the same position. As a result, the display controller unit 31 maintains a symbol arrangement on the video reels 41A-41E left-right symmetric throughout a spin of the video reels 41A-41E as shown in FIG. 5C.

At predetermined time intervals, the display controller unit 31 causes the middle display unit 3B to stop the video reels 41A-41E pair by pair into their respective stop positions selected by the game controller unit. Preferably, the display controller unit 31 stops the pairs in the order from outermost to innermost as follows.

Figure 5D:
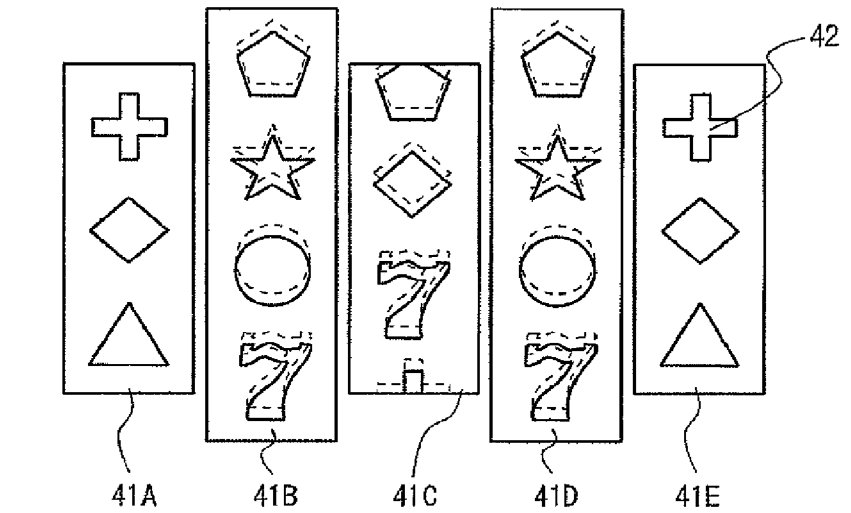
FIG. 5D shows an example of symbols displayed at the stop of symbols in the outermost columns in the bonus round.

First, the display controller unit 31 stops the outermost pairs, i.e., the pair of the first video reel 41A and the fifth video reel 41E in the same stop position as shown in FIG. 5D. Here, the game controller unit has determined only the stop position of the first video reel 41A. Accordingly, the game controller unit instructs the display controller unit 31, or the display controller unit 31 itself decides to match the stop position of the fifth video reel 41E with the stop position of the first video reel 41A.

Figure 5E:
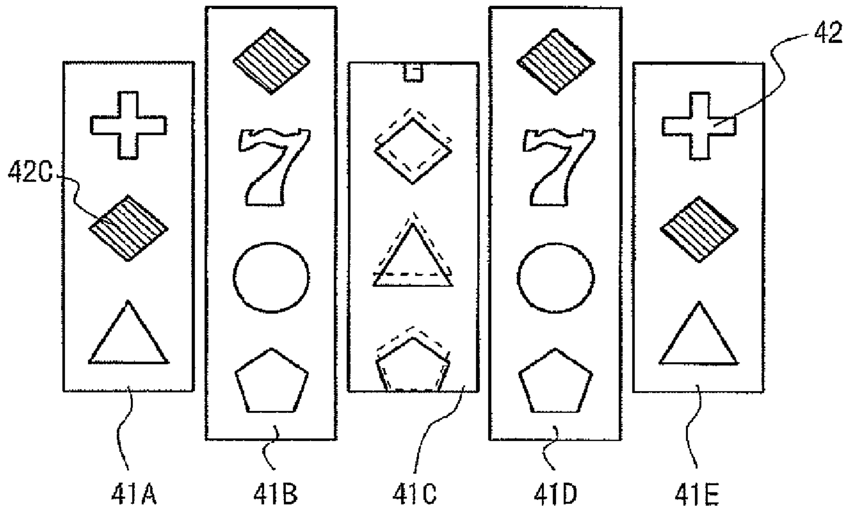
FIG. 5E shows an example of symbols displayed at the stop of symbols in the next inner columns in the bonus round.

Second, the display controller unit 31 stops the next inner pairs, i.e., the pair of the second video reel 41B and the fourth video reel 41D in the same stop position as shown in FIG. 5E. Here, the game controller unit has determined only the stop position of the second video reel 41B. Accordingly, the game controller unit instructs the display controller unit 31, or the display controller unit 31 itself to match the stop position of the fourth video reel 41D with the stop position of the second video reel 41B.

Referring to FIG. 5E, four “diamond” symbols has already appeared on the stopped four video reels 41A, 41B, 41D, and 41E, before the stop of the third video reel 41C. If a “diamond” symbol appear on the third video reel 41C when it will be stopped, a payout equal to a bet times a factor that corresponds to five “diamond” symbols promises to be provided to the player. In this manner, if two symbols of the same type appear on the first video reel 41A and the second video reel 41B, chances are much better that a larger amount of a payout corresponding to five symbols of the same type is won, since two symbols of the same type also appear on the fourth video reel 41D and the fifth video reel 41E. Thus, the left-right symmetric arrangement of symbols as shown in FIG. 5E effectively raises player’s expectations for winning a larger amount of payouts.

Finally, the display controller unit 31 stops the third video reel 41C in a stop position determined by the game controller unit in advance.

If the game controller unit has decided to provide no award to the player in advance, at most two symbols of the same type appear on the stopped video reels 41A-41E. The game controller unit finishes the bonus round, and then starts the next bonus round.

Figure 5F:
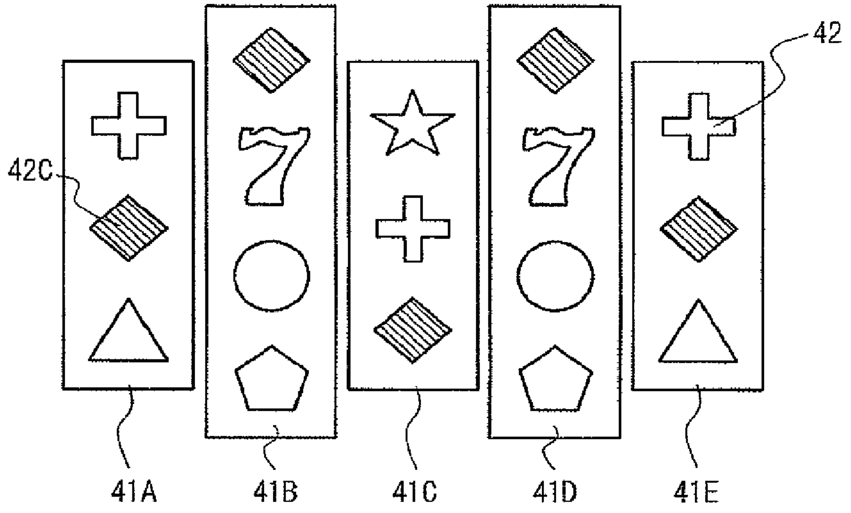
FIG. 5F shows an example of stopped symbols displayed in the bonus round.

If the game controller unit has decided to provide the player with a payout, a corresponding winning combination appears on the stopped video reels 41A-41E. Referring to FIG. 5F, five “diamond” symbols appear on all the stopped video reels 41A-41E. The game controller unit then instructs the lighting controller unit 29 and the sound controller unit 30 to produce visual and sound effects for informing a player of winning an award. After that, the game controller unit updates the credit data stored in the RAM 23 to increase the player’s credits by a payout to be provided as an award. In the case of FIG. 5F, the player wins a payout equal to a bet times a factor that corresponds to five “diamond” symbols. In such a manner, there is a much better chance that a player wins a larger amount of payouts in a bonus round than in a normal round. If the game controller unit has decided to provide the player with a right to play a bonus round, three or more trigger symbols 42B are scattered on the stopped video reels 41A-41E in a similar manner to FIG. 5B. The game controller unit then instructs the lighting controller unit 29 and the sound controller unit 30 to produce specific visual and sound effects. The game controller unit further starts the next bonus round.

If a predetermined times of bonus rounds has been finished, the game controller unit changes the bonus mode to the normal mode, and waits until the console unit 25 accepts a new bet or an instruction from the player. If instructed by the player, the game controller unit may convert his/her credits into cash or the like by using the payout controller unit 26.

In the above-described manner, the game controller unit determines an arrangement of symbols on the condition that symbols are arranged in the same order and at the same positions in two or more columns at a bonus round. Accordingly, chances are fairly better that a winning combination will appear in the arrangement in a bonus round than in a normal round. Furthermore, the display controller unit 31 causes the middle display unit 3B to spin the two or more columns of symbols from the same position in synchronization with each other as shown in FIGS. 5C-5E. This effectively raises player’s expectations for winning an award. On the other hand, the condition is easy to impose on the game controller unit. The display controller unit 31 can easily control the two or more columns of symbols spinning in the abovementioned synchronized manner. Thus, the gaming machine can provide a player with a better chance of winning an award in a simple manner, and cause the player to recognize the chance through simple and clear visual effects, without any heavy burden on game designers and developers.

Note that symbols may be arranged in a square lattice on a game screen. In this case, each vertical line of the square lattice forms a video reel. All horizontal lines and/or slanted lines of the square lattice are preferably selectable as paylines. A player guesses on which payline a winning combination, e.g., three or more aligned symbols of the same type will appear, and then places a bet on a desired payline before symbols are changed in their arrangement. If a winning combination appears on the payline where the player has placed a bet, the player will win an amount of a payout that depends on the amount of the bet and the type of the winning combination. When a game is conducted by this rule, the gaming machine arranges symbols on left-right symmetric video reels in a bonus round. This also enables the gaming machine to provide a player with a better chance of winning an award in a simple manner, and cause the player to recognize the chance through simple and clear visual effects, without any heavy burden on game designers and developers.

The video reels 41A-41E may be replaced with mechanical reels. In this case, the same symbol sequences are displayed or printed on the circumferential surfaces of the first and fifth reels. Similar is true for the second and fourth reels.

General Interpretation of Terms

In understanding the scope of the present invention, the term "configured" as used herein to describe a component, section or portion of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single portion or a plurality of portions. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims Furthermore, the foregoing descriptions of the embodiments according to the present invention are provided for illustration only, and not for the purpose of limiting the invention as defined by the appended claims and their equivalents.

What is claimed is:

1. A gaming machine comprising:

a display unit configured to display symbols on a plurality of reels, spin the reels, arrange the symbols in the same order on at least one pair of reels, and stop the reels, the at least one pair of reels being arranged in a position with respect to one another within the plurality of reels, such that an identity of the at least one pair of reels is determined prior to initiation of a game on the gaming machine;

a console unit configured to accept instructions from a player; a game controller unit configured to:

start a round of the game in response to an instruction accepted by the console unit, determine an arrangement of the symbols at random on a condition that the symbols are arranged in the same order and at the same positions in the at least one pair of reels, retrieve a winning combination from the arrangement of symbols, and provide the player with an award depending on the winning combination retrieved from the arrangement of symbols; and a display controller unit configured to cause the display unit to spin the symbols of the at least one pair of reels, and stop the symbols in the at least one pair of reels at the same position to display the arrangement of the symbols determined by the game controller unit.

2. A gaming machine, as set forth in claim 1, wherein the display controller unit is configured to display a first pair of reels having symbols arranged at the same position, and a second pair of reels having symbols arranged at the same position.

3. A gaming machine, as set forth in claim 1, wherein the display unit comprises a mechanical reel rotatable around its axis and having a circumferential surface on which a column of symbols is displayed.

4. A gaming machine, as set forth in claim 1, wherein the display unit comprises an electric display device on which a column of symbols is displayed in a graphic form.

5. A gaming machine, as set forth in claim 1, wherein the game controller unit is configured to determine an arrangement of symbols at random on the condition that the symbols are arranged in the same order and at the same positions in the at least one pair of reels in bonus games, and the display controller unit is configured to cause the display unit to spin all reels of symbols independently in normal games, and spin the symbols of the at least one pair of reels from the same position in synchronization with each other in the bonus games.

6. A gaming machine, as set forth in claim 1, wherein the at least one pair of reels are adjacent.

7. A gaming machine, as set forth in claim 1, wherein the at least one pair of reels are separated by at least one other reel.

8. A gaming machine, as set forth in claim 1, wherein the display controller unit adjusts a rotation speed of the plurality of reels so that the symbols of the at least one pair of columns reels can be synchronized.

9. A method of displaying symbols on a gaming machine comprising:

displaying symbols on a plurality of reels on a display device, and arranging the symbols in the same order on at least one pair of reels, the at least one pair of reels being arranged in a position with respect to one another within the plurality of reels, such that an identity of the at least one pair of reels is determined prior to the initiation of a game on the gaming machine;

determining an arrangement of symbols at random on a condition that symbols are arranged in the same order and at the same positions in the at least one pair of the plurality of reels by a controller;

retrieving a winning combination from the arrangement of symbols;

spinning symbols of the plurality of reels;

stopping the symbols of the at least one pair of reels at the same position in a predetermined order to display the determined arrangement of symbols on the display device; and providing the player with an award depending on a winning combination retrieved from the determined arrangement of the symbols.

10. A method, as set forth in claim 9, wherein the at least one pair of reels are adjacent.

11. A method, as set forth in claim 9, wherein the at least one pair of reels are separated by at least one other reel.

12. A method, as set forth in claim 9, further including the step of adjusting a rotation speed of the plurality of reels so that the symbols of the at least one pair of reels can be synchronized by a display controller of the gaming machine.

13. A method, as set forth in claim 9, further including the step of arranging the symbols in the same order in a first pair of reels, and arranging the symbols in the same order in a second pair of reels.

14. A gaming machine comprising:

a display unit configured to display symbols in a plurality of reels;

a console unit configured to accept instructions from a player;

a game controller unit coupled to the display unit and the console unit for initiating a normal game in response to an instruction accepted by the console unit, the game controller unit in initiating the normal game being configured to:

randomly determine an arrangement of the symbols;

spin the symbols on the display unit and stop the symbols in the randomly determined arrangement; and detect an occurrence of a winning combination of symbols and responsively provide the player with an award depending on the winning combination retrieved from the arrangement of symbols;

the game controller unit for detecting a trigger condition within the normal game and responsively initiating a bonus game, the game controller unit in initiating the bonus game being configured to:

randomly determine a second arrangement of the symbols;

spin the symbols on the display unit and stop the symbols in the randomly determined second arrangement; and detect an occurrence of a second winning combination of symbols and responsively provide the player with a bonus award depending on the second winning combination retrieved from the second arrangement of symbols, wherein during the bonus game, the symbols on at least one pair of reels are the same and in the same order, the game controller unit is adapted to stop the symbols on the at least one pair of reels at the same position in the bonus game, and the at least one pair of reels being arranged in a position with respect to one another within the plurality of reels, such that an identity of the at least one pair of reels is determined prior to initiation of the normal game on the gaming machine and independent of a location associated with the trigger condition.

15. A gaming machine, as set forth in claim 14, wherein during the bonus game, the symbols on a first pair of reels are arranged in the same order and the symbols on a second pair of reels are arranged in the same order.

16. A gaming machine, as set forth in claim 14, wherein the at least one pair of reels are adjacent.

17. A gaming machine, as set forth in claim 14, wherein the at least one pair of reels are separated by at least one other reel.

18. A method of displaying symbols on a gaming machine comprising:

displaying symbols on a plurality of reels on a display unit of the gaming machine initiating a normal game in response to an instruction received by a player, the normal game including the steps of:

randomly determining an arrangement of the symbols;

spinning the symbols on the display unit and stopping the symbols in the randomly determined arrangement; and detecting an occurrence of a winning combination of symbols and responsively providing the player with an award depending on the winning combination retrieved from the arrangement of symbols;

detecting a trigger condition within the normal game and responsively initiating a bonus game, the bonus game including the steps of:

randomly determining a second arrangement of the symbols;

spinning the symbols on the display unit and stopping the symbols in the randomly determined second arrangement; and detecting an occurrence of a second winning combination of symbols and responsively providing the player with a bonus award depending on the second winning combination retrieved from the second arrangement of symbols, wherein during the bonus game, the symbols on at least one pair of reels are the same and in the same order, a game controller unit is adapted to stop the symbols on the at least one pair of reels at the same position in the bonus game, and the at least one pair of reels being arranged in a position with respect to one another within the plurality of reels, such that an identity of the at least one pair of reels is determined prior to initiation the normal game on the gaming machine and independent of a location associated with the trigger condition.

19. A method, as set forth in claim 18, further including the step of, during the bonus game, spinning the plurality of reels such that a first pair of reels includes symbols arranged in the same order and a second pair of reels includes symbols that are in the same order.

20. A method, as set forth in claim 18, wherein the at least one pair of reels are adjacent.

21. A method, as set forth in claim 18, wherein the at least one pair of reels are separated by at least one other reel.

* * * * *